United States Patent
Laor et al.

(10) Patent No.: US 9,811,763 B2
(45) Date of Patent: Nov. 7, 2017

(54) METHODS AND SYSTEMS FOR BUILDING A MEDIA CLIP

(71) Applicant: SOCIAL STUDIOS LTD., Tel Aviv, IL (US)

(72) Inventors: Ben Laor, Givataim (IL); Moshe Delgo, Sde-Varburg (IL)

(73) Assignee: SOCIAL STUDIOS LTD., Tel Aviv (IL)

( * ) Notice: Subject to any disclaimer, the term of this patent is extended or adjusted under 35 U.S.C. 154(b) by 0 days.

(21) Appl. No.: 14/995,404

(22) Filed: Jan. 14, 2016

(65) Prior Publication Data
US 2017/0206438 A1    Jul. 20, 2017

(51) Int. Cl.
*G06K 9/62* (2006.01)
*G06N 99/00* (2010.01)

(52) U.S. Cl.
CPC ......... *G06K 9/6267* (2013.01); *G06N 99/005* (2013.01)

(58) Field of Classification Search
CPC ...... G06K 9/66; G06K 9/6255; G06K 9/6216; G06K 9/00228; G06K 9/6267; G06F 17/30249; G06N 99/005
See application file for complete search history.

(56) References Cited

U.S. PATENT DOCUMENTS

| | | | | |
|---|---|---|---|---|
| 7,363,361 B2 * | 4/2008 | Tewari | ..................... | H04L 12/14 709/223 |
| 7,739,327 B2 * | 6/2010 | Mutton | .................... | H04L 29/06 709/203 |
| 7,849,159 B2 * | 12/2010 | Elman | ..................... | H04N 7/173 709/217 |
| 8,055,688 B2 * | 11/2011 | Giblin | ............... | G06F 17/30817 707/702 |
| 8,213,689 B2 * | 7/2012 | Yagnik | .............. | G06F 17/30781 382/118 |
| 8,606,848 B2 * | 12/2013 | Chai | ................. | G06F 17/30044 709/203 |
| 8,909,617 B2 * | 12/2014 | Wang | .................. | G06F 17/3089 707/709 |
| 9,099,152 B2 * | 8/2015 | Marcus | ................ | G11B 27/034 |

OTHER PUBLICATIONS

Getty images, downloaded Jun. 27, 2016, from http://www.gettyimages.com/.
Bayesian inference, downloaded Jun. 27, 2016, from https://en.m.wikipedia.org/wiki/Bayesianin_inference.
Support vector machine, downloaded Jun. 27, 2016 from https://en.m.wikipedia.org/wiki/Support_vector_machine.

* cited by examiner

*Primary Examiner* — Amir Alavi
(74) *Attorney, Agent, or Firm* — Browdy and Neimark, PLLC

(57) ABSTRACT

A method of building a media clip based on at least Internet content includes extracting relevant text content from the Internet content, and relevant media content from the Internet content and/or from other sources of content, wherein the extraction of the relevant media content is based on at least the extracted text content, and/or the extraction of the relevant text content is based on at least the extracted media content, and building a media clip representing the Internet content based on at least part of the relevant text content and the relevant media content. A method of training a system for building a media clip based on at least Internet content takes into account the user input.

20 Claims, 6 Drawing Sheets

Fig. 5

METHODS AND SYSTEMS FOR BUILDING A MEDIA CLIP

TECHNICAL FIELD

The presently disclosed subject matter relates to the field of building a media clip based at least on Internet content.

BACKGROUND

Websites generally comprise various data in order to present information to a user. For instance, websites generally comprises text, media content (e.g. images and/or videos), sounds, etc. Websites may also comprise ads.

It may be interesting for users to build a media clip based on the content of a website. This media clip may for example represent the content of an article of the website.

In the prior art, tools have been developed in order to build such media clips.

These tools automatically extract part of the content of the article and build a video based on this extracted content. The extraction may for instance be a random extraction.

There is now a need to propose new methods and systems for building a media clip based on Internet content.

GENERAL DESCRIPTION

In accordance with certain aspects of the presently disclosed subject matter, there is provided a method of training a system for building a media clip based on at least Internet content, comprising extracting relevant content from the Internet content, said extraction being based on at least one relevance criterion, allowing a user to select a subset of the relevant content, and based on at least this selection, updating the at least one relevance criterion, for training the system to extract the relevant content for building a media clip representing the Internet content.

According to some embodiments, the method comprises comprising extracting relevant text content and/or media content, said media content comprising at least an image and/or a video. According to some embodiments, the method comprises extracting relevant text content from the Internet content, based on at least a first relevance criterion, extracting relevant media content from the Internet content and/or from additional sources of content, based on at least a second relevance criterion which comprises detecting a presence of at least part of said extracted relevant text content in meta data associated with the media content, allowing a user to select a subset of the relevant content, and based on at least this selection, updating at least one of the first and second relevance criterion, for training the system to extract the relevant content for building a media clip representing the Internet content. According to some embodiments, the method comprises extracting relevant media content from the Internet content, based on at least a first criterion, extracting relevant text content from at least the Internet content, based on at least a second relevance criterion which comprises a list of text expressions present in metadata associated to the extracted relevant media content, allowing a user to select a subset of the relevant content, and based on at least this selection, updating at least one of the first and second relevance criterion, for training the system to extract the relevant content for building a media clip representing the Internet content. According to some embodiments, the relevance criterion comprises at least one of a position of a text or media content in the Internet content, a size of a text or media content in the Internet content, a location of a text or media content in the Internet content, a presence of relevant text content in meta data of a media content in the Internet content, a frequency of appearance of a text or media content, a tag associated to the content of the Internet content, and meta data associated to a media content.

In accordance with some aspects of the presently disclosed subject matter, there is provided a method of building a media clip based on at least Internet content, comprising extracting relevant text content from the Internet content, and relevant media content from the Internet content and/or from other sources of content, wherein the extraction of the relevant media content is based on at least the extracted text content, and/or the extraction of the relevant text content is based on at least the extracted media content, and building a media clip representing the Internet content based on at least part of said relevant text content and said relevant media content.

According to some embodiments, the extraction of the relevant media content from the Internet content and/or from other sources of content comprises detecting a presence of at least part of said extracted relevant text content in meta data associated with the media content. According to some embodiments, the method comprises allowing a user to select a subset of the relevant content. According to some embodiments, the method comprises updating at least a relevance criterion used for extracting the relevant text content and/or the relevant media content based on the user selection. According to some embodiments, the method comprises associating a relevance score for each extracted text content and/or media content, and selecting the extracted text content and/or media content for the media clip based on at least this relevance score. According to some embodiments, the method comprises extracting, from the Internet content, portions of text which comprise the extracted relevant text content, and associating each portion of text with a part of the extracted relevant media content, for building the media clip. According to some embodiments, the association comprises comparing meta data associated to each extracted relevant media content, with the extracted portions of text. According to some embodiments, the method comprises allowing a user to publish the media clip on the Internet.

In accordance with some aspects of the presently disclosed subject matter, there is provided a system for building a media clip based on at least Internet content, comprising a user interface, an extraction module configured to extract relevant content from the Internet content, said extraction being based on at least one relevance criterion, wherein the system is operable on a processing unit and is further configured to allow a user to select a subset of the relevant content with the user interface, and based on at least this selection, update the at least one relevance criterion, for training the extracting module to extract the relevant content for building a media clip representing the Internet content.

According to some embodiments, the system is configured to extract relevant text content from the Internet content, based on at least a first relevance criterion, and extract relevant media content from the Internet content and/or from additional sources of content, based on at least a second relevance criterion which comprises a presence of at least part of said extracted relevant text content in meta data associated with the media content, allow a user to select a subset of the relevant content, and based on at least this selection, update at least one of the first and second relevance criterion, for training the system to extract the relevant content for building a media clip representing the Internet content.

In accordance with some aspects of the presently disclosed subject matter, there is provided a system for building a media clip based on at least Internet content, the system being operable on a processing unit and being configured to extract relevant text content from the Internet content, and relevant media content from the Internet content and/or from other sources of content, wherein the extraction of the relevant media content is based on at least the extracted text content, and/or the extraction of the relevant text content is based on at least the extracted media content, and build a media clip representing the Internet content based on at least part of said relevant text content and said relevant media content.

According to some embodiments, the system is configured to extract the relevant media content from the Internet content and/or from other sources of content based on a detection of a presence of at least part of said extracted relevant text content in meta data associated with the media content. According to some embodiments, the system comprises a user interface allowing a user to select a subset of the relevant content, wherein the system is configured to update at least a relevance criterion used for extracting the relevant text content and/or the relevant media content based on the user selection.

In accordance with some aspects of the presently disclosed subject matter, there is provided a non-transitory storage device readable by a machine, tangibly embodying a program of instructions executable by the machine to perform a method of training a system for building a media clip based on at least Internet content, comprising extracting relevant content from the Internet content, said extraction being based on at least one relevance criterion, allowing a user to select a subset of the relevant content, and based on at least this selection, updating the at least one relevance criterion, for training the system to extract the relevant content for building a media clip representing the Internet content.

In accordance with some aspects of the presently disclosed subject matter, there is provided a non-transitory storage device readable by a machine, tangibly embodying a program of instructions executable by the machine to perform a method of building a media clip based on at least Internet content, comprising extracting: relevant text content from the Internet content, and relevant media content from the Internet content and/or from other sources of content, wherein the extraction of the relevant media content is based on at least the extracted text content, and/or the extraction of the relevant text content is based on at least the extracted media content, and building a media clip representing the Internet content based on at least part of said relevant text content and said relevant media content.

According to certain embodiments of the invention, the extraction of relevant content takes into account the user's input and is improved based on the user's feedback.

According to certain embodiments of the invention, the extraction of relevant content is enriched by extracting additional content from various related sources of content.

According to certain embodiments of the invention, the building of a media clip is performed in reduced time.

According to certain embodiments of the invention, the user may provide his feedback at various levels of the method for building the media clip.

According to certain embodiments of the invention, the user may preview the media clip and publish the media clip on the Internet.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "extracting", "allowing", "updating", "building", "detecting", "associating", "selecting", or the like, refer to the action(s) and/or process(es) of a processor that manipulate and/or transform data into other data, said data represented as physical, such as electronic, quantities and/or said data representing the physical objects.

The term "processing unit" covers any computing unit or electronic unit that may perform tasks based on instructions stored in a memory, such as a computer, a server, a chip, etc. It encompasses a single processor or multiple processors, which may be located in the same geographical zone or may, at least partially, be located in different zones and may be able to communicate together.

Embodiments of the presently disclosed subject matter are not described with reference to any particular programming language. It will be appreciated that a variety of programming languages may be used to implement the teachings of the presently disclosed subject matter as described herein.

Figure 1:
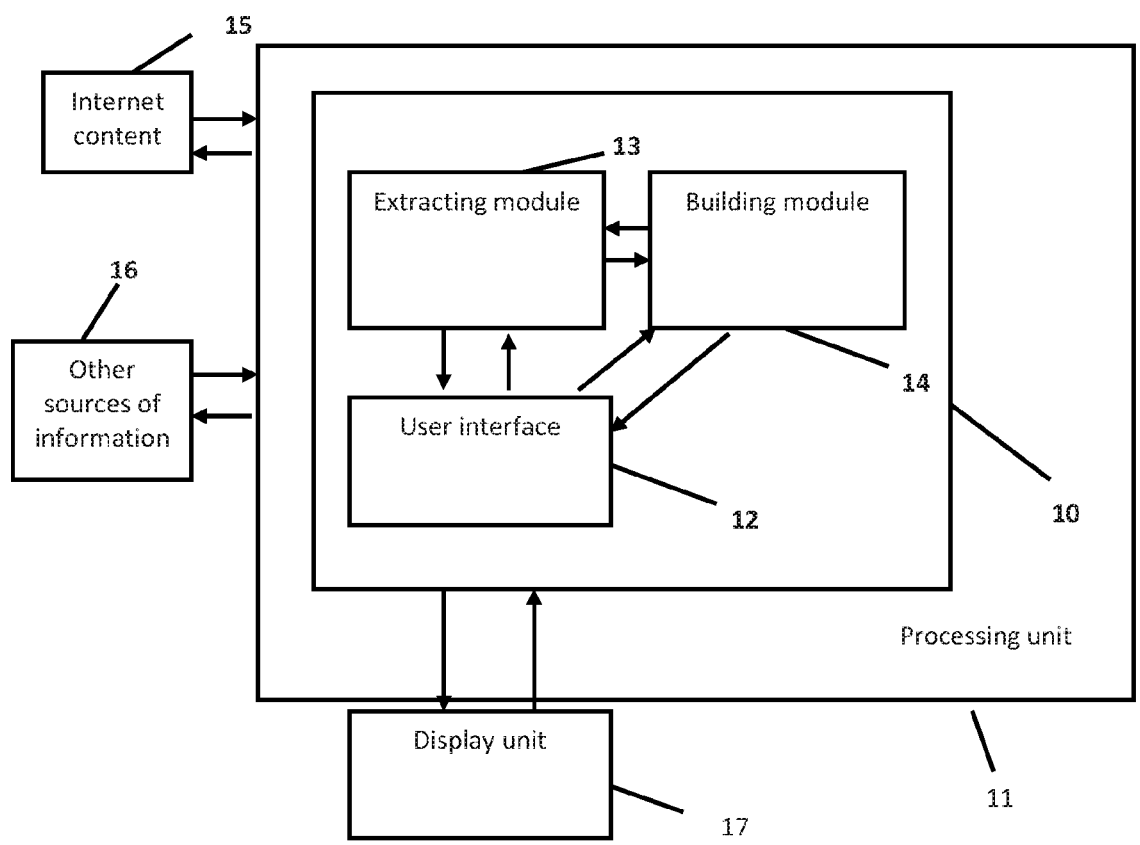
FIG. 1 illustrates an embodiment of a system for building a media clip based on at least Internet content.

FIG. 1 illustrates an embodiment of a system 10 for building a media clip based on at least Internet content.

As illustrated, the system 10 is operable on a processing unit 11.

The system 10 may comprise a user interface 12 (which may be a software interface which causes a physical display unit to display a visual interface to a user). The user interface 12 allows the user to interact with the system 10, in particular in the process of selecting content and building the media clip. It may allow the user to participate to the building of the media clip, as explained later in the specification. The user interface 12 may be configured to display on a display unit 17 (e.g. a screen) the content extracted by the system 10, the different steps of the building of the media clip, and various options or possible selections proposed to the user during the building of the media clip.

The system 10 may further comprise an extracting module 13. The extracting module 13 may be configured to extract relevant content, in particular from Internet content 15, based on which a media clip is to be built. According to some embodiments, the extracting module 13 comprises a machine learning algorithm.

The Internet content 15 may comprise an Internet website or a plurality of Internet websites, an article or a plurality of articles taken from one website or from a plurality of websites, a portion of a website or a plurality of portions of a website or of a plurality of websites, etc. This list is not limitative. Based on at least this Internet content, a media clip may be built by the system 1.

The system 10 may receive and exchange data with an Internet network through any known communication system.

According to some embodiments, the system 10 may be configured to exchange data with other sources of information 16 such as content database which are accessible on the Internet (such as the website "GettyImages", www.gettyimages.com) or which are not accessible on the Internet (such as private database of the user). The other sources of information 16 may include additional Internet content other than the Internet content on which the media clip is to be based and built (such as supplementary websites or articles). It may also include data uploaded by the user.

The system 10 may further comprise a building module 14 which may be configured to build the media clip based on the content extracted by the extracting module 13 and, if necessary, based also on the user input.

Figure 2:
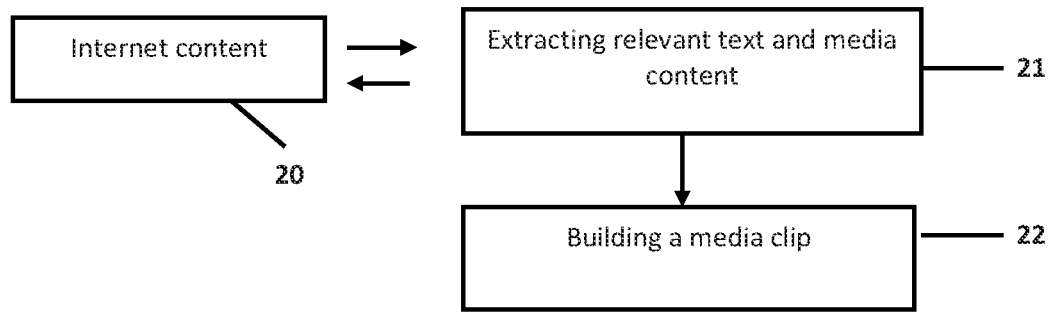
FIG. 2 illustrates an embodiment of a method of building a media clip based on at least Internet content.

An embodiment of a method of building a media clip based on at least Internet content is illustrated in FIG. 2. The Internet content 20 from which the media clip is to be built may be for instance selected by the user.

The method may comprise a step 21 of extracting relevant text content from the Internet content 20, and relevant media content (such as images and/or videos) from the Internet content 20. This step may be performed by the extracting module 13. A repository of relevant text and media content may be built based on this extraction, and may be stored in a database communicating with the system 1.

The relevant text content which is extracted may be based on one or more relevance criterions. Based on at least these relevance criterions, a relevance score may be attributed to each extracted content.

Various relevance criterions may be used to extract the relevant text content, which include for example (but are not limited to):

a position of a text content in the Internet content (for instance, the text that is at the beginning of an article is generally more representative that the rest of the text, this criterion being a mere example);

a size of a text content in the Internet content (for instance, text that is represented with larger fonts is likely to be more representative than the rest of the text, this criterion being a mere example);

a frequency of appearance of a text content (text that appears the most frequently is likely to be more representative than the rest of the text);

a tag associated to the text content of the Internet content.

A combination of various criterions may be used.

Similarly, various relevance criterions may be used to extract the relevant media content, which include for example (but are not limited to):

a location of a media content in the Internet content (for instance, some predetermined position in a particular website may be known in advance as comprising ads);

a size of the media content;

a link of the media content to another website (this may indicate that the media content is an ad);

a presence of relevant text content in meta data of the media content in the Internet content;

a frequency of appearance of a media content;

a tag associated to the content of the Internet content.

The media clip may then be built (step 22), based at least on the extracted text content and media content. According to some embodiments, the relevance score is used to select a subset of the extracted text content and/or media content for building the media clip. A threshold may be set to define the level of relevancy for which the content is to be selected and used for building the media clip.

Figure 3:
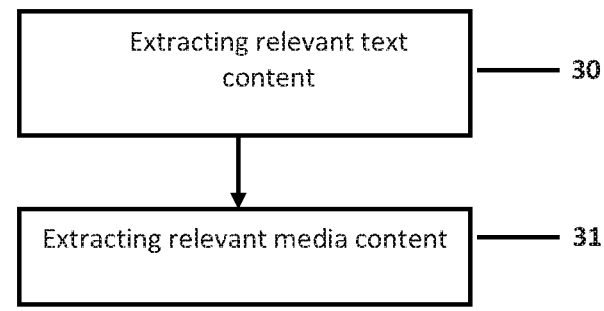
FIG. 3 illustrates an embodiment of an extraction of relevant media content which is based on extracted relevant text content.

According to some embodiments, and as illustrated in FIG. 3, the extraction of the relevant media content may be based on at least the extracted text content.

For example, the relevant text content is extracted from the Internet content 20 (various search and text algorithms may be used, such as, but not limited to, Conditional random fields classifier). This extraction may be based on at least a relevance criterion, as mentioned with reference to FIG. 2. This relevance criterion may be chosen so as to select the content from the Internet content which is the most representative of said Internet content.

The relevant media content may then be extracted based on the extracted relevant text content.

In particular, according to some embodiments, the extraction method may comprise detecting a presence of at least part of said extracted relevant text content in meta data associated with the media content.

Meta data includes data that describe the content of the media content. Meta data includes for instance headline of the media content, summary of the media content, comments associated to the media content, title of the media content, etc.

Meta data may also include data that describe the media content but that are not visible to the user. Indeed, for example, the HTML img "alt" attribute of the images and/or videos may encompass data which describe their content. The method may access this data when receiving the Internet content, or by sending appropriate queries to the website. Other meta data may be accessed depending on the content.

Figure 4:
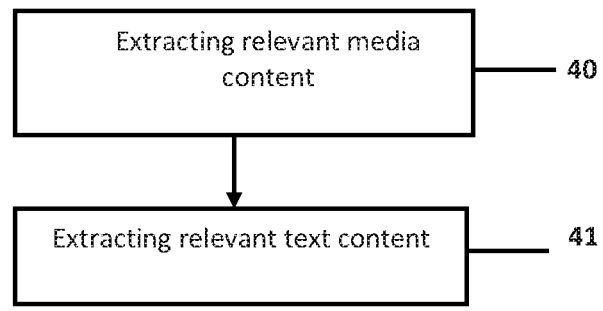
FIG. 4 illustrates an embodiment of an extraction of relevant text content which is based on extracted relevant media content.

According to some embodiments, and as illustrated in FIG. 4, the extraction of the relevant text content may be based on at least the extracted relevant media content.

The relevant media content may be extracted (step 40) according to one or more relevance criterions, as mentioned with respect to FIG. 2.

Then, the meta data of the media content that were extracted may be analyzed to extract keywords. The whole content of the meta data may be set as keywords. Alternatively relevant keywords are selected from the meta data based on one or more relevance criterions.

These keywords may then be used to find, in the Internet content, relevant text content, by using a text match algorithm.

Relevant text content is then identified and extracted (step 41).

According to some embodiments, a combination of the methods described in FIG. 3 and FIG. 4 may be used.

For example, relevant text content is extracted from the Internet content based on at least one relevance criterion. Then, relevant media content is extracted by comparing the extracted text content with the meta data associated to said media content. Then, new keywords are identified in the meta data of the extracted relevant media content, using a relevance criterion. These new keywords are then used to find additional relevant text content in the Internet content, or in other sources of content, by using a text match algorithm. This additional relevant text content is then extracted. This additional relevant text content may be used again to find additional relevant media content in the Internet content or in other sources of content.

Figure 5:
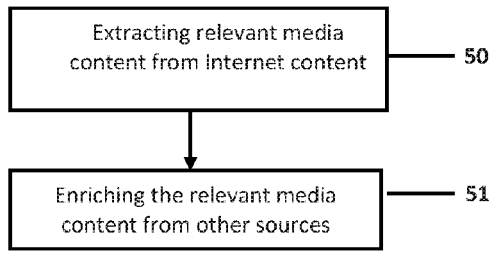
FIG. 5 illustrates an embodiment of enriching a repository built from extracted relevant text and media content.

FIG. 5 illustrates the fact that the repository of extracted relevant text content and media content which was built from the Internet content may be enriched.

In particular, according to some embodiments, media content from other sources of content is extracted. Other sources of content include other websites, or at least articles, other than the Internet content currently analyzed, and which may comprise relevant media content. Other sources of content may also include a private database of the user (for example, a newspaper may have its own image/video database), or which may be accessible upon payment of a fee. Other sources of content may also include data uploaded by the user.

According to some embodiments, once the relevant text content has been extracted from the Internet content, it may be used to find additional media content from other sources of content (step 51). This may allow enriching the repository with more information than the information of the Internet content (currently analyzed) itself. This may be useful for instance if the article to be analyzed does not comprise sufficient media content to build a media clip.

Accordingly, a detection of a presence of at least part of the extracted relevant text content in meta data associated with the media content of these other sources of content may be performed (this step is similar to step 31). This detection allows selecting additional media content from the other sources of content, for enriching the repository.

Figure 6:
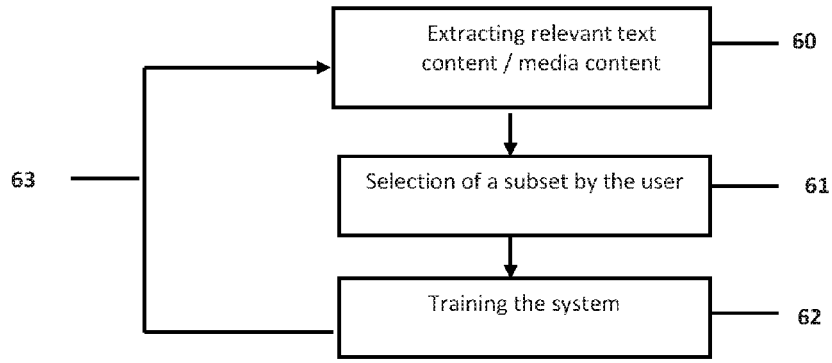
FIG. 6 illustrates possible embodiments in which the user may interact with the extracting and/or building process, so as to train the system.

FIG. 6 illustrates possible embodiments in which the user may interact with the extracting and/or building process.

Once the relevant text content and media content is extracted from the Internet content and/or from other sources of content (step 60), a user may receive a proposal by the system 1 to select a subset of the relevant content.

For this purpose, the system 1 may display to the user the relevant content that was extracted. This display may be performed by taking into account the relevance score of the relevant text content and media content.

The user may thus decide to select only part of the extracted relevant content (step 61), because he considers that only this part is relevant.

The user may also disregard part of the extracted content because he considers that the system 1 has selected by error text content or media content which are not relevant.

The input of the user may be e.g. performed through the user interface of the system 1, which displays appropriate selection menu on a display screen.

According to some embodiments, the system 1 is trained (step 62) based on at least this selection. Thus, it may learn from the user's input in order to improve its future content extraction (and even its current extraction).

According to some embodiments, at least one relevance criterion is updated based on at least this user selection, for training the system to extract the relevant content for building a media clip representing the Internet content.

For example, if the user disregarded part of the text content that was extracted, the relevance criterion used for selecting this text content may be updated by the system.

For instance, the system 1 may learn from the user's feedback that a particular location or a particular font indicates that the text is less relevant, or, to the contrary, is more relevant (this is a non limiting example). A score associated to each relevance criterion may be updated for reflecting the user's selection.

A machine learning algorithm (which may be run on the extracting module) may be used to take into account the user's input and thus improve the relevance criterions for this Internet content, by updating the parameters of the models, based on the newly acquired positive/negative annotated results. Known per se machine learning algorithms can be used such as (but not limited to) generative learning models (e.g. Bayesian Inference, which is described e.g. in https://en.m.wikipedia.org/wiki/Bayesian_inference, hereby incorporated by reference) and/or discriminative learning models (e.g. Support Vector Machine, which is described e.g. in https://en.m.wikipedia.org/wild/Support_vector_machine, hereby incorporated by reference).

According to some embodiments, the user may select a subset of the media content extracted from the Internet content. At least a relevance criterion used for selecting this media content may be updated. For example, the relevance criterion which comprises the position of the media content in the Internet content may be updated to reflect the user's input (some particular positions may be designated as less relevant whereas some other particular positions may be designated as more relevant).

This applies to the various possible relevance criterions that may be used to extract the relevant text and/or media content.

According to some embodiments (as already described with respect e.g. to FIGS. 3 and 5), the media content is extracted from the Internet content and/or from other sources of content by detecting a presence of at least part of the extracted relevant text content in meta data associated with the media content.

In this case, the relevance criterion may be viewed as the presence of the relevant text content in the meta data associated with the media content.

If the user selects a subset of this media content, the associated relevance criterion (which is here the list of keywords present in the extracted relevant text content) may be updated. For example, if an image comprises in its meta data the expressions A/B/C and this image was unselected by the user, and A/B are keywords present in the extracted relevant text content, these keywords may be deleted or attributed a lower score.

Some of the keywords of the extracted relevant text content may be deleted in accordance with the images that were disregarded by the user, or the relevance score associated to each of the keyword may be updated for reflecting the user's choice.

The user's choice in the media content may thus have an impact on the extracted text content. The user's choice may have an impact for the current extraction, since the extracted text content is updated based on the selection of media content by the user, and also for the future extraction since the system 1 updates the relevance criterion based on this choice.

According to some embodiments, the training method is performed for each Internet content separately. Indeed, the relevance criterion for a particular website may be different for another website. Alternatively, the training method may be performed for a plurality of Internet content.

According to some embodiments, and as illustrated by the arrow 63 in FIG. 6, an iterative training may be performed in order to train the system and improve extraction of the relevant content.

It is to be noted that the user's selection may be performed at various stages, including e.g. after the relevant text content was extracted, and/or after the relevant image content was extracted, and/or after the relevant text and image content has been extracted.

In order to allow a selection by the user, the system 1 may be configured to display at least the extracted relevant text content, and/or the extracted relevant image content. The display may take into account the relevance score of the extracted content, in order to limit the view to the most relevant content. The user may sort the display depending on the relevance score.

Once a repository of relevant text and media content was built as explained in the various previous embodiments, a text script may be built for the media clip representing the Internet content. This is shown in reference to FIG. 7.

The extracted relevant text content generally comprises a list of keywords, which are not necessarily full sentences.

According to some embodiments, a method for building a text script for the media clip may be carried out.

The method may comprise a step 70 of extracting, from the Internet content, portions of text which comprise the extracted relevant text content. Portions of text may include text that is readable in itself (e.g. sentences).

A previous step of dividing the text part of the Internet content into sentences may be performed (using e.g. a text recognition algorithm based on punctuation). Then, each sentence which comprises one of the keywords present in the extracted relevant text content may be selected and extracted.

The text script may then be associated to the media content.

According to some embodiments, the method comprises a step 71 of associating each portion of text with a part of the extracted relevant media content, for building the media clip.

According to some embodiments, this association may comprise comparing:

meta data associated to each extracted relevant media content, with the extracted portions of text.

If this comparison indicates that there is a match, or at least a partial match, it is possible to associate the portion of text to the corresponding media content or group of media content.

This method may thus output groups of media content, each group being associated at least a portion of text which was taken from the Internet content. A particular example is provided in FIG. 10.

Figure 8:
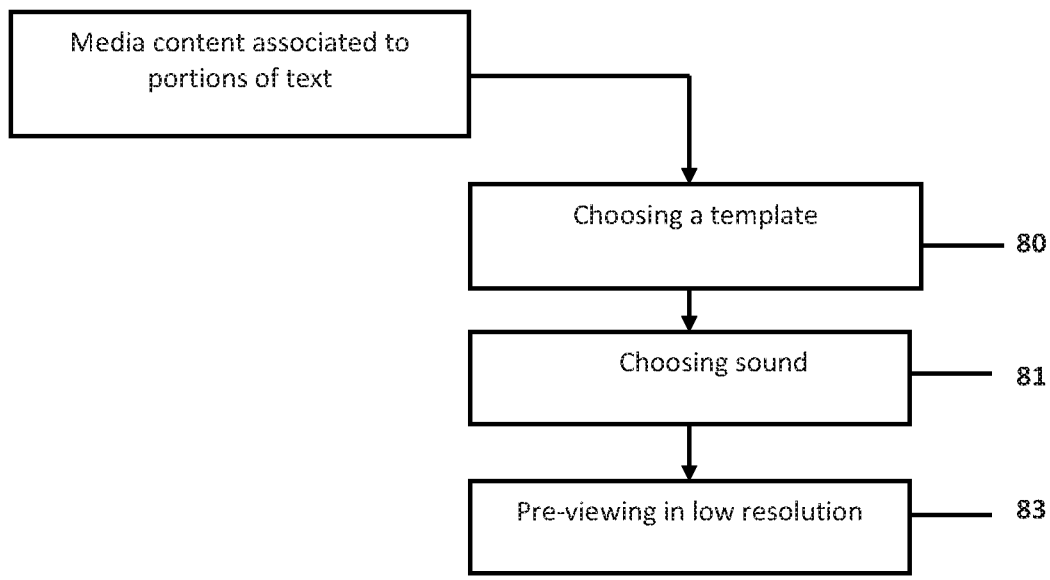
FIG. 8 illustrates an embodiment of a method of building a media clip.

Turning now to FIG. 8, possible further steps for building the media clip are shown.

The user may be asked to choose a template (step 80), which comprises the various parameters of the media clip (size, color, etc.). The user may also be asked to choose the sound associated to the media clip, for instance in a pre stored database (step 81).

Figure 7:
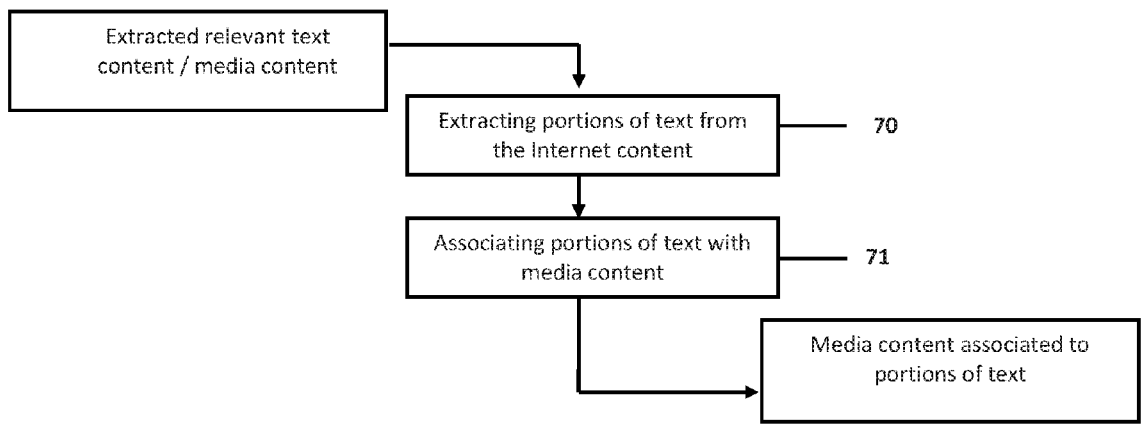
FIG. 7 illustrates an embodiment of a method for extracting readable portions of text and associating them to the extracted media content.

The media clip may then be built by the system 1: the portions of text may be superimposed on the media content, according to the association computed with the method of FIG. 7. The chosen template and the chosen sound may then be used for building the final media clip.

The system 1 may provide a pre-view in low resolution to the user (step 83), which may give him the choice to purchase or not the final media clip in a higher resolution. The system 1 may allow the user to publish the media clip on the Internet, for instance on social networks such as Facebook™.

Figure 9:
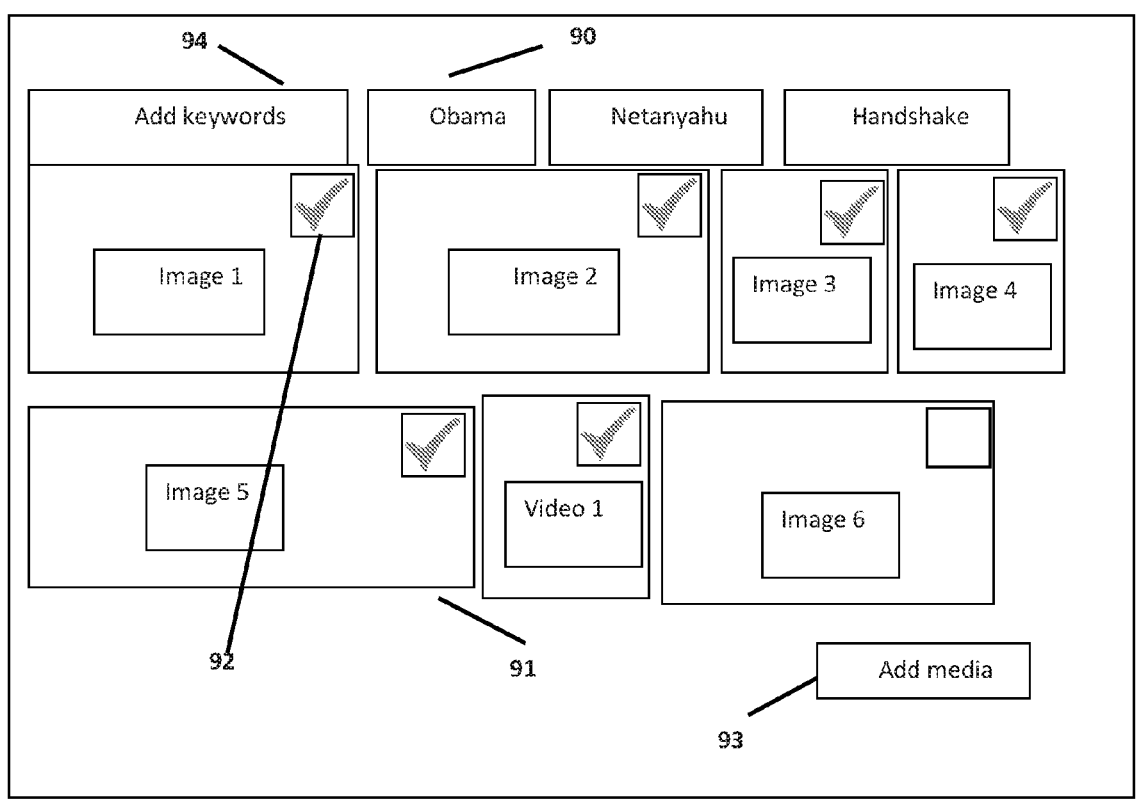
FIG. 9 illustrates a view that the system may display to a user in a particular example, wherein relevant text content and relevant media content have been extracted from a web article.
Figure 10:
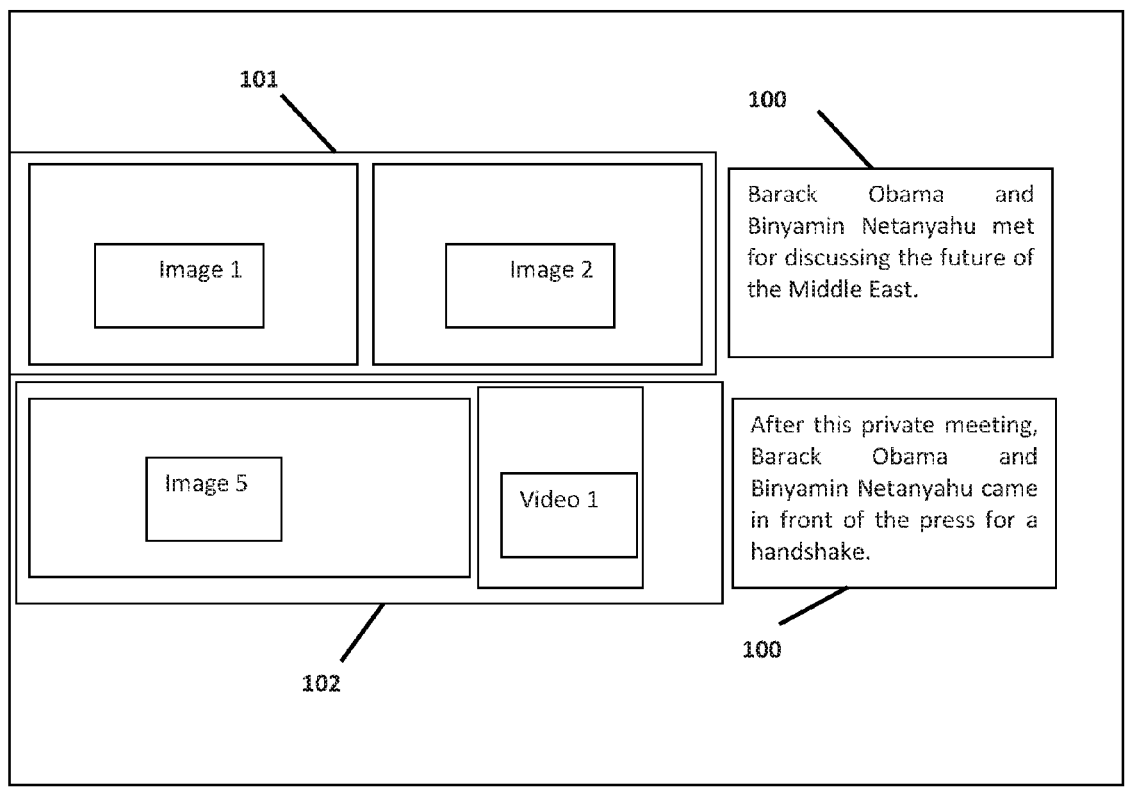
FIG. 10 illustrates another view that the system may display to a user in the same example as in FIG. 9, wherein readable portions of text have been extracted from the article and associated to groups of media content.

FIGS. 9-10 describe a particular example for building a media clip, based on at least Internet content. This example is not limitative.

In this example, the Internet content is a web article which describes a meeting between Barack Obama and Binyamin Netanyahu.

As shown in FIG. 9, the system may display to the user the relevant text content that was extracted from the article, in the form of a list of keywords 90. They may be displayed depending on their associated relevant score.

The system may also display the relevant media content 91 that was extracted from the article, and also from other sources of content (such as from other websites which comprise articles handling a similar topic, or from a media database e.g. comprising images of B. Obama and B. Netanyahu).

As shown, the user may select or unselect the extracted text content and/or media content, by using a selecting box 92 (in FIG. 9, Image 6 was unselected by the user). As mentioned, this selection may used by the system to improve the relevance criterions used for extracting the relevant content from the article and from other sources of content.

The user may also add media and/or text content (see boxes 93, 94).

FIG. 10 represents the text script 100 that is extracted from the article based on the relevant keywords. As represented, each part of the text script is associated to a group (group 101, group 102, . . . ) of media content comprising at least an image and/or a video.

The user may change or edit the text script, and the different groups of media content.

In a next step, the user may choose a template and, if necessary, background sound.

A media clip is then built, by superimposing the text script to the groups of media content, and by editing the media clip with the appropriate template and background sound.

A preview of a media clip is then proposed to the user, who may then purchase it or publish it on the Internet.

The invention contemplates a computer program being readable by a computer for executing one or more methods of the invention. The invention further contemplates a machine-readable memory tangibly embodying a program of instructions executable by the machine for executing one or more methods of the invention.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of training a system for building a media clip based on at least Internet content, comprising:
    extracting relevant content from the Internet content, said extraction being based on at least one relevance criterion,
    allowing a user to select a subset of the relevant content,
    based on at least this selection, updating the at least one relevance criterion, for training the system to extract the relevant content for building a media clip representing the Internet content.

2. The method of claim 1, comprising extracting relevant text content and/or media content, said media content comprising at least an image and/or a video.

3. The method of claim 1, comprising:
    extracting relevant text content from the Internet content, based on at least a first relevance criterion,
    extracting relevant media content from the Internet content and/or from additional sources of content, based on at least a second relevance criterion which comprises detecting a presence of at least part of said extracted relevant text content in meta data associated with the media content,
    allowing a user to select a subset of the relevant content, and
    based on at least this selection, updating at least one of the first and second relevance criterion, for training the system to extract the relevant content for building a media clip representing the Internet content.

4. The method of claim 1, comprising:
    extracting relevant media content from the Internet content, based on at least a first criterion,
    extracting relevant text content from at least the Internet content, based on at least a second relevance criterion which comprises a list of text expressions present in metadata associated to the extracted relevant media content,
    allowing a user to select a subset of the relevant content, and
    based on at least this selection, updating at least one of the first and second relevance criterion, for training the system to extract the relevant content for building a media clip representing the Internet content.

5. The method of claim 1, wherein the relevance criterion comprises at least one of:
    a position of a text or media content in the Internet content,
    a size of a text or media content in the Internet content,
    a location of a text or media content in the Internet content,
    a presence of relevant text content in meta data of a media content in the Internet content,
    a frequency of appearance of a text or media content,
    a tag associated to the content of the Internet content, and
    meta data associated to a media content.

6. A method of building a media clip based on at least Internet content, comprising:
    extracting:
        relevant text content from the Internet content, and
        relevant media content from the Internet content and/or from other sources of content,
        wherein the extraction of the relevant media content is based on at least the extracted text content, and/or the extraction of the relevant text content is based on at least the extracted media content, and
    building a media clip representing the Internet content based on at least part of said relevant text content and said relevant media content.

7. The method of claim 6, wherein the extraction of the relevant media content from the Internet content and/or from other sources of content comprises detecting a presence of at least part of said extracted relevant text content in meta data associated with the media content.

8. The method of claim 6, comprising allowing a user to select a subset of the relevant content.

9. The method of claim 8, comprising updating at least a relevance criterion used for extracting the relevant text content and/or the relevant media content based on the user selection.

10. The method of claim 6, comprising:
    associating a relevance score for each extracted text content and/or media content, and
    selecting the extracted text content and/or media content for the media clip based on at least this relevance score.

11. The method of claim 6, further comprising:
    extracting, from the Internet content, portions of text which comprise the extracted relevant text content, and
    associating each portion of text with a part of the extracted relevant media content, for building the media clip.

12. The method of claim 11, wherein the association comprises comparing:
    meta data associated to each extracted relevant media content, with
    the extracted portions of text.

13. The method of claim 11, further comprising allowing a user to publish the media clip on the Internet.

14. A system for building a media clip based on at least Internet content,
    wherein the system is operable on a processing unit and is configured to:
        extract relevant content from the Internet content, said extraction being based on at least one relevance criterion,
        allow a user to select a subset of the relevant content with a user interface, and
        based on at least this selection, update the at least one relevance criterion, for training the system to extract the relevant content for building a media clip representing the Internet content.

15. The system of claim 14, configured to:
extract relevant text content from the Internet content, based on at least a first relevance criterion,
extract relevant media content from the Internet content and/or from additional sources of content, based on at least a second relevance criterion which comprises a presence of at least part of said extracted relevant text content in meta data associated with the media content,
allow a user to select a subset of the relevant content, and
based on at least this selection, update at least one of the first and second relevance criterion, for training the system to extract the relevant content for building a media clip representing the Internet content.

16. A system for building a media clip based on at least Internet content, the system being operable on a processing unit and being configured to:
extract:
relevant text content from the Internet content, and
relevant media content from the Internet content and/or from other sources of content,
wherein the extraction of the relevant media content is based on at least the extracted text content, and/or the extraction of the relevant text content is based on at least the extracted media content, and
build a media clip representing the Internet content based on at least part of said relevant text content and said relevant media content.

17. The system of claim 16, configured to extract the relevant media content from the Internet content and/or from other sources of content based on a detection of a presence of at least part of said extracted relevant text content in meta data associated with the media content.

18. The system of claim 16, comprising a user interface allowing a user to select a subset of the relevant content, wherein the system is configured to update at least a relevance criterion used for extracting the relevant text content and/or the relevant media content based on the user selection.

19. A non-transitory storage device readable by a machine, tangibly embodying a program of instructions executable by the machine to perform a method of training a system for building a media clip based on at least Internet content, comprising:
extracting relevant content from the Internet content, said extraction being based on at least one relevance criterion,
allowing a user to select a subset of the relevant content, and
based on at least this selection, updating the at least one relevance criterion, for training the system to extract the relevant content for building a media clip representing the Internet content.

20. A non-transitory storage device readable by a machine, tangibly embodying a program of instructions executable by the machine to perform a method of building a media clip based on at least Internet content, comprising:
extracting:
relevant text content from the Internet content, and
relevant media content from the Internet content and/or from other sources of content,
wherein the extraction of the relevant media content is based on at least the extracted text content, and/or the extraction of the relevant text content is based on at least the extracted media content, and
building a media clip representing the Internet content based on at least part of said relevant text content and said relevant media content.

* * * * *